United States Patent
> Pitchford

[15] 3,676,331

[45] July 11, 1972

[54] UPGRADING OF CRUDE OILS

[72] Inventor: Armin C. Pitchford, Bartlesville, Okla.

[73] Assignee: Phillips Petroleum Company

[22] Filed: June 19, 1970

[21] Appl. No.: 47,598

[52] U.S. Cl. ................................................208/112
[51] Int. Cl. ..............................................C10g 13/02
[58] Field of Search ...................................208/112

[56] References Cited

UNITED STATES PATENTS

| | | | |
|---|---|---|---|
| 2,057,402 | 10/1936 | Tropsch | 208/112 X |
| 1,954,478 | 10/1934 | Egloff | 208/112 X |
| 3,073,777 | 1/1963 | Oettinger | 208/112 X |
| 3,153,100 | 10/1964 | White | 208/112 X |
| 1,160,670 | 11/1915 | Thompson | 208/112 X |
| 3,586,621 | 6/1971 | Pitchford et al. | 208/112 |
| 3,125,511 | 3/1964 | Tupman et al. | 208/112 X |

*Primary Examiner*—Tobias E. Levow
*Assistant Examiner*—P. F. Shaver
*Attorney*—Young and Quigg

[57] ABSTRACT

A method and catalyst for the upgrading of hydrocarbons which employs a multiple component catalyst system to generate hydrogen in situ and to thereby produce, within the hydrocarbons, materials of low molecular weight, and of reduced carbon residue and sulfur content.

9 Claims, No Drawings

UPGRADING OF CRUDE OILS

This invention relates to the upgrading of hydrocarbons.

In one of its more specific aspects, this invention relates to the in situ generation of hydrogen in contact with a hydrocarbon to thereby produce materials of low molecular weight and of reduced carbon residue and sulfur content.

Numerous processes are known for treating hydrocarbons. There has now been discovered a process in which a catalyst system is employed to generate hydrogen within the hydrocarbon, the hydrogen thereupon reacting with components within the hydrocarbon to improve the hydrocarbon in respect to its sulfur content and carbon residue.

According to the method of this invention, there is provided a process for upgrading hydrocarbons which comprises introducing water and a catalyst system containing at least two components into the hydrocarbon, at least one of the components of the catalyst system promoting the generation of hydrogen by reacting with the water and at least one of the components promoting reactions between the hydrogen generated and constituents of the hydrocarbon to produce a hydrocarbon from which are separable liquid products of reduced molecular weight, carbon residue and sulfur content.

Accordingly, it is an object of this invention to provide a process for treating hydrocarbons and, in particular, crude oil, which process lessens the need for subsequent treatment of the individual cuts derived from the hydrocarbon.

The term "catalyst system" as employed herein refers to those substances which, when contacted with the hydrocarbon and water, produce hydrogen which reacts with the hydrocarbon to effect the aforementioned changes in the hydrocarbon.

The method and catalyst of this invention are applicable to the treatment of any hydrocarbon and, in particular, to any sulfur-containing hydrocarbon. Such sulfur is found in many stocks including crude oils, residual oils, gas oil and middle distillates. The method is particularly applicable to crude oils in the absence of prior treatment and the invention will be explained in reference to crude oils without meaning to limit the invention thereto.

This invention contemplates the production of hydrogen in the presence of water and the crude oil by means of the water gas shift reaction. Preferably, the process is carried out by distributing water throughout the crude oil and introducing the first agent of the catalyst system into contact with the water to produce the hydrogen. The second agent of the system is introduced either prior to, or simultaneously with, the introduction of the first agent and facilitates the reaction between the hydrogen generated and various constituents of the crude oil to produce the desired improvement.

Suitable materials for use as the first agent of the catalyst system are the carboxylic acid salts of barium, calcium, strontium and magnesium, these salts having from about eight to about 40 carbon atoms per molecule. This first agent will be soluble in the crude oil in the quantities employed. Examples of suitable first agents are barium stearate, barium ricinoleate, barium 12-hydroxystearate, barium naphthenate, barium laurate, calcium octanoate, strontium triacontanoate, magnesium eicosanoate and mixtures thereof. The first agent is added to the crude oil in amounts from about 0.5 to about 2 percent by weight of the crude oil.

Suitable second agents for facilitating the reaction of the crude oil constituents with the hydrogen are the carboxylic salts of nickel, cobalt and iron, these salts having from about eight to about 40 carbon atoms per molecule. Examples of such second agents are nickel octanoate, nickel stearate, nickel naphthenate, ferrous naphthenate, ferrous hentriacontanoate, ferric stearate, cobalt salts of these same carboxylic acids, and their mixtures. These materials are added to the crude oil in individual amounts of from about 0.05 to about 20 percent by weight, preferably from about 0.2 to about 5.0 percent. These materials should be soluble in the crude oil to the extent to which they are added thereto.

As mentioned, the crude oil will contain a quantity of water dissolved or dispersed therein. Since it is desirable to insure adequate water, an excess of water beyond that soluble or dispersible in the crude oil is unobjectionable. This water can be the natural water content of the crude oil or can be added to the crude oil from an extraneous source. Preferably, it is desirable that water be present in water to crude oil volumetric ratios of from 0.1 to about 5 and preferably from about 0.2 to about 2.5.

No preliminary treatment of the crude oil is normally required unless such is directed to removal of components which would be deleterious to the agents of the catalyst system. If the hydrocarbon is a crude oil, it normally need not be desalted.

The two agents of the system can be incorporated in the crude oil in any manner suitable to affect dispersion therethrough. While wide ranges of the two agents can be employed, they are preferably employed such that the weight ratio of the first to the second agent is about 1 to about 2.

In conducting the process, the catalyst system is introduced into the water and crude oil and the mixture brought to reaction conditions. The reactions are carried out at pressures from about 300 psig to about 4000 psig, preferably from about 500 psig to about 2500 psig in order to maintain a principal portion of the crude oil in the liquid state. A reaction temperature of from about 750° F. to about 850° F., preferably from about 790° F. to about 835° F. is employed.

A series of runs is set forth hereinafter to demonstrate the invention. In each run of both series, Eocene-Ratawi crude oil of the following properties was upgraded:

| | |
|---|---|
| Gravity, ° API 60/60° F. | 20.4 |
| Molecular Weight | 656 |
| Carbon Residue, Weight % | 9.0 |
| Sulfur, Weight % | 4.0 |

In the runs of Table I, the crude oil having the catalyst system contained therein was introduced into a reactor into which water, in the form of steam, was introduced. The reactor was positioned within a furnace to attain the desired temperature.

Certain gases, liquid hydrocarbons and water were taken overhead from the reactor; the condensate of hydrocarbon and water was collected in an accumulator, a gaseous product being evolved from the accumulator as overhead. This gas contained that sulfur expelled from the crude as hydrogen sulfide. At the completion of the test period, the water was separated from the hydrocarbon and discarded. That material remaining thereafter as liquid hydrocarbon is designated as "Effluent" in the test results.

After the removal of this liquid hydrocarbon from the accumulator, the accumulator was washed with a hydrocarbon solvent, immaterially, pentane or hexane, to remove any residual hydrocarbon from the side walls. The resulting pentane or hexane solution was distilled leaving a residue; this residue was caustic treated and the remainder designated in the test results as "Washings."

That portion of the reactor charge which remained in the reactor is designated in the test results as "Reactor Residue."

Table I below presents the results of four runs. Run No. 1 employed neither the method nor catalyst of the invention.

Run No. 2 employed only nickel naphthenate, a second agent which facilitates the conversion of sulfur compounds.

Runs No. 3 and 4 employed the catalyst system of this invention, barium naphthenate being the first agent and nickel naphthenate being the second agent.

Results of the four runs were as follows:

TABLE I

| Run Number | 1 | 2 | 3 | 4 |
|---|---|---|---|---|
| Feed Composition, wt. % | | | | |
| eocene-ratawi crude | 100.0 | 97.0 | 97.0 | 97.5 |
| Nickel Naphthenate | 0.0 | 3.0 | 2.0 | 2.0 |
| Barium Naphthenate | 0.0 | 0.0 | 1.0 | 0.5 |

| | | | | |
|---|---|---|---|---|
| Operating Conditions | | | | |
| Temperature, °F. | 780 | 780 | 840 | 768–835 |
| Pressure, psig | 500 | 500 | 500 | 500 |
| Water/crude volume ratio | 0.92 | 1.06 | 0.83 | 1.07 |
| Contact time, hours | 4.5 | 6.75 | 7.5 | 8.0 |
| Gaseous Products | | | | |
| Gas produced, l. | 36.8 | 22.0 | 23.2 | – |
| Composition of Gas Phase, mol % | | | | |
| $H_2$ | 12.6 | 2.9 | 43.4 | – |
| CO | 0.0 | nil | – | 0.67 |
| $CO_2$ | 0.0 | 0.7 | 1.7 | 2.16 |
| $H_2S$ | 0.9 | 5.2 | 3.1 | – |
| $CH_4$ | 33.0 | 58.2 | 24.0 | 61.8[a] |
| $C_2H_6 + C_2H_4$ | 17.3 | 10.5 | 11.4 | – |
| $C_3H_8$ | 11.1 | 6.9 | 5.7 | – |
| $C_3H_6$ | 0.0 | 2.3 | 1.7 | – |
| $i + nC_4H_{10}$ | 0.0 | 2.4 | 2.4 | – |
| Butenes | 4.6 | 9.2 | 6.6 | – |
| Heavier | 20.4 | 1.7 | | |
| Liquid Hydrocarbon Products | | | | |
| Effluent Collected in Separator,[1] wt. % | 90.0 | 71.5 | 84.7 | 77.5 |
| API gravity, 60° F. | 23.5 | 30.6 | 30.9 | 31.3 |
| Carbon, wt. % | 84.2 | 83.8 | 84.4 | 84.2 |
| Hydrogen, wt. % | 11.7 | 12.0 | 12.5 | 11.9 |
| Sulfur, wt. % | 3.3 | 2.66 | 2.63 | 2.60 |
| Molecular Weight | 323 | 290 | 221 | 209 |
| Carbon Residue, wt. % | 7.79 | 4.96 | 2.96 | 2.97 |
| Separator Washings,[2] wt. % | 5.0 | 28.5 | 7.1 | 11.2 |
| Sulfur, wt. % | 3.40 | 3.08 | 3.35 | 3.1 |
| Carbon Residue, wt. % | 8.9 | 8.03 | 6.25 | 5.86 |
| Reactor Residue,[3] wt. % | 5.0 | 4.6 | 4.7 | 2.3 |
| Sulfur, wt. % | 7.5 | 2.2 | 4.42 | 4.7 |
| Carbon Residue, % | – | – | 14.98 | 13.85 |
| Solid Reaction Products, Coke, wt. % | nil | | 3.5 | |
| Sulfur, wt. % | | | 9.1 | |
| Sulfur Removed from Crude Oil, % of Original Crude | 11.8 | 33.5 | 30.8 | 32.3 |

(a) Contains also $H_2S$ (3.5–4.5%)
(1) Effluent collected in water/hydrocarbon separator.
(2) The water/hydrocarbon separator was washed with pentane and hexanes to remove the liquid products from the sidewalls. The pentane and hexanes were removed by distillation and after treatment with NaOH to remove $H_2S$ and mercaptans, the remains are termed *Separator Washings*.
(3) The reactor residue is the material remaining in the reactor. The reactor sidewalls are washed with toluene or benzene (the toluene or benzene is removed by distillation).

The above data demonstrate the operability of the method and catalyst of this invention. They further indicate that the employment of a catalyst system comprised of both agents is more effective in altering the nature of the products recoverable from the crude oil than is the use of a single agent of that system; that is, the use of only the first agent to promote the production of hydrogen is less effective than is the use of both agents of the system.

More surprisingly, however, the above data indicate that the employment of the dual component system of this invention permits a reduction of the quantity of catalyst employed in the single component system while still producing an extensive change in the nature of the products recovered from the crude oil as well as a reduction.

Further, the use of the dual component catalyst system produced an increase in the water gas activity as indicated by an increase in $CO_2$ production from 0.7 mole percent in Run 2 to 1.7 mole percent in Run 3 and 2.6 mole percent in Run 4. Further hydrogen production increased from 2.9 mole percent in Run 2 to 43.4 mole percent in Run 3.

Relatedly, the molecular weight and the carbon residue of the effluent were both lowered.

Hence, it is seen that the present invention provides a valuable method and catalyst for the treatment of hydrocarbons.

It will be evident from the foregoing that various modifications can be made to this invention. Such, however, are considered to be within the scope of the invention.

What is claimed is:

1. A method of producing an upgraded crude oil which comprises:
    a. introducing into contact with a crude oil and water under conditions to produce hydrogen a first catalyst comprising at least one first carboxylic acid salt of a metal selected from the group consisting of barium, calcium, strontium and magnesium, said first carboxylic acid salt containing from about eight to about 40 carbon atoms per molecule;
    b. introducing into contact with said crude oil, said hydrogen and said water, under conditions to upgrade said crude oil, a second catalyst comprising at least one second carboxylic acid salt of a metal selected from the group consisting of nickel, cobalt and iron, said second carboxylic acid salt containing from about eight to about 40 carbon atoms per molecule; and
    c. recovering the upgraded crude oil.

2. The method of claim 1 in which said first carboxylic acid salt is selected from the group consisting of barium stearate, barium ricinoleate, barium 12-hydroxystearate, barium naphthenate, barium laurate, calcium acetonate, strontium triacontanoate and magnesium eicosanoate and said second carboxylic acid salt is selected from the group consisting of nickel octanoate, nickel stearate, nickel naphthenate, ferrous naphthenate, ferrous hentriacontanoate, ferric stearate, cobalt octanoate, cobalt stearate, cobalt naphthenate, and cobalt hentriacontanoate.

3. The method of claim 1 in which said first and second catalysts are introduced into contact with said crude oil in individual amounts within the range of from about 0.05 to about 20 weight percent.

4. The method of claim 1 in which water is present in said crude oil in an amount within the range of from about 0.1 to about 5 volumes per volume of crude oil.

5. The method of claim 1 in which said first catalyst and said second catalyst are introduced into said contact in weight ratios within the range of from about 1 to about 2.

6. The method of claim 1 in which said crude oil is maintained at a temperature within the range of from about 750° F. to about 850° F. and at a pressure within the range of from about 300 psig to about 4000 psig.

7. The method of claim 2 in which said first and second catalysts are introduced into contact with said crude oil in individual amounts within the range of from about 0.05 to about 20 weight percent.

8. The method of claim 2 in which said first catalyst comprises barium naphthenate and said second catalyst comprises nickel naphthenate.

9. The method of claim 8 in which said first and said second catalysts are simultaneously introduced into contact with said crude oil.

* * * * *